(12) United States Patent
Kuroide

(10) Patent No.: US 8,812,530 B2
(45) Date of Patent: Aug. 19, 2014

(54) DATA PROCESSING DEVICE AND DATA PROCESSING METHOD

(75) Inventor: Takeshi Kuroide, Tokyo (JP)

(73) Assignee: NEC Corporation, Tokyo (JP)

( * ) Notice: Subject to any disclaimer, the term of this patent is extended or adjusted under 35 U.S.C. 154(b) by 609 days.

(21) Appl. No.: 12/700,487

(22) Filed: Feb. 4, 2010

(65) Prior Publication Data

US 2010/0205151 A1 Aug. 12, 2010

(30) Foreign Application Priority Data

Feb. 6, 2009 (JP) ................................ 2009-025817

(51) Int. Cl.
G06F 7/00 (2006.01)
G06F 17/30 (2006.01)

(52) U.S. Cl.
USPC .......................................... 707/764; 714/4.11

(58) Field of Classification Search
USPC ..................... 707/674; 714/1, 2, 4.1, 4.11, 11
See application file for complete search history.

(56) References Cited

U.S. PATENT DOCUMENTS

| | | | | |
|---|---|---|---|---|
| 6,049,853 | A * | 4/2000 | Kingsbury et al. ............ | 711/147 |
| 6,088,330 | A | 7/2000 | Bruck et al. | |
| 6,922,791 | B2 * | 7/2005 | Mashayekhi et al. ......... | 714/4.11 |
| 7,225,356 | B2 * | 5/2007 | Monitzer .......................... | 714/12 |
| 7,480,817 | B2 * | 1/2009 | Fan et al. ......................... | 714/4.4 |
| 2004/0098371 | A1 * | 5/2004 | Bayliss et al. ..................... | 707/3 |
| 2005/0283658 | A1 * | 12/2005 | Clark et al. ...................... | 714/11 |
| 2006/0020640 | A1 | 1/2006 | Suzuki et al. | |
| 2008/0046779 | A1 * | 2/2008 | Merchant et al. ................. | 714/6 |
| 2008/0140735 | A1 * | 6/2008 | Darrington et al. ........... | 707/204 |
| 2009/0132657 | A1 * | 5/2009 | Surtani et al. ................. | 709/205 |
| 2009/0259741 | A1 * | 10/2009 | Shen et al. ..................... | 709/223 |
| 2010/0094921 | A1 * | 4/2010 | Roy et al. ...................... | 709/201 |

FOREIGN PATENT DOCUMENTS

| | | |
|---|---|---|
| CN | 1415091 A | 4/2003 |
| CN | 1724980 A | 1/2006 |
| JP | 8-314875 A | 11/1996 |
| JP | 9-146812 A | 6/1997 |
| JP | 9-171479 A | 6/1997 |
| JP | 2003067232 A | 3/2003 |
| JP | 2003-258997 A | 9/2003 |
| JP | 2004102450 A | 4/2004 |
| JP | 2005141528 A | 6/2005 |
| JP | 2006268104 A | 10/2006 |

OTHER PUBLICATIONS

Japanese Office Action for JP2009-025817 mailed Nov. 24, 2010.
Chinese Office Action for CN201010113712.6 dated Dec. 28, 2012.

* cited by examiner

Primary Examiner — Jeffrey A Burke
(74) Attorney, Agent, or Firm — Sughrue Mion, PLLC

(57) ABSTRACT

When a failure occurs in data matching processing, a quick data backup processing is required. For such an object, the data processing apparatus includes a data distribution part which stores a file data group in a normal data holding area of the j-th matching node and performs a backup processing by dividing the file data included in the file data group in the backup data holding area in the matching nodes other than the j-th matching node. The backup processing is performed by distributing each of the file data in the file data group to the backup data holding area in turn from a least backup data holding area where a file data being currently stored is least among the matching nodes.

4 Claims, 4 Drawing Sheets

DATA PROCESSING DEVICE AND DATA PROCESSING METHOD

INCORPORATION BY REFERENCE

This application is based on Japanese Patent Application No. 2009-025817 filed on Feb. 6, 2009. The disclosure of that application is incorporated herein by reference.

TECHNICAL FIELD

The present invention relates to data matching.

BACKGROUND ART

A high-performance data matching apparatus is known which performs matching of fingerprints or the like by using highly-parallel matching processors. With such an apparatus, an own memory is provided with each of the plurality of matching processors. To each of the own memories, file data (data which is previously registered and accumulated for use in matching of target data being a subject of the matching, and which is referred to as the F data in this specification) is previously transferred from a higher-level apparatus. Each F data is previously registered for comparison with target data provided as the subject of the matching from the higher-level apparatus. The high-performance data matching apparatus performs high-speed matching by the plurality of processors parallelly performing matching between the F data stored in the own memories respectively provided with the processors and the subject data.

In the Japanese Patent Publication No. 2003-258997, which is an example of a conventional technique, a service control node system of a distributed control type is described. This system includes a plurality of modules capable of independently operate and their coupling organization, and has databases for service control distributed in the plurality of modules respectively.

SUMMARY OF THE INVENTION

For running a high-performance data matching apparatus having highly-parallel matching processors in nonstop operation, a redundant system can be adopted. In such a system, specifically, the same number of processors and memories as those of the originally installed processors and memories are prepared as backups and then matching is performed simultaneously with the normal F data and the backup data, thereby permitting fault tolerant matching. However, in the high-performance data matching apparatus with a redundant system, there is a problem that a large number of processors is required, and the cost, power consumption, and installation space are increased.

Another means for the nonstop operation is using a small number of spare processors by switching to each other when a failure occurs. However, with this means, it is a problem that the data in the failure processor disappears. Thus, the following processing is required: reporting the failure to a higher-level apparatus; retransmitting the target data and all the F data which having been stored in the own memory of the failure processor from the higher-level apparatus; and redoing the matching processing from its beginning. Consequently, it takes long time for coping with a failure, which has raised a problem of increase of processing time.

According to an aspect of the present invention, a data processing apparatus includes: a plurality of matching nodes, each of the plurality of matching nodes has a normal data holding area and a backup data holding area; and a data distribution part configured to store file data group, which includes a plurality of file data being registered for matching in advance, in the normal data holding area of a j-th (j is an integer) matching node of the plurality of data nodes when the file data group is inputted, to perform a backup processing by dividing the plurality of file data included in the file data group for distributing the plurality of file data to the backup data holding area of each of the plurality of matching nodes other than the j-th matching node as a backup data. The backup processing is performed by distributing each of the plurality of file data included in the file data group to the backup data holding area in turn from a least backup data holding area where a file data being currently stored is least among the plurality of matching nodes.

According to an aspect of the present invention, a data processing method includes: providing a plurality of matching nodes, each of the plurality of matching nodes has a normal data holding area and a backup data holding area; storing file data group, which includes a plurality of file data being registered for matching in advance, in the normal data holding area of a j-th (j is an integer) matching node of the plurality of data nodes when the file data group is inputted; and performing a backup processing by dividing the plurality of file data included in the file data group for distributing the plurality of file data to the backup data holding area of each of the plurality of matching nodes other than the j-th matching node as a backup data. The backup processing is performed by distributing each of the plurality of file data included in the file data group to the backup data holding area in turn from a least backup data holding area where a file data being currently stored is least among the plurality of matching nodes.

According to the present invention, the time required for backup processing performed in a case where a failure occurs in data matching can be shortened.

BRIEF DESCRIPTION OF THE DRAWINGS

The above and other objects, advantages and features of the present invention will be more apparent from the following description of certain preferred exemplary embodiments taken in conjunction with the accompanying drawings, in which.

EXEMPLARY EMBODIMENTS

Figure 1:
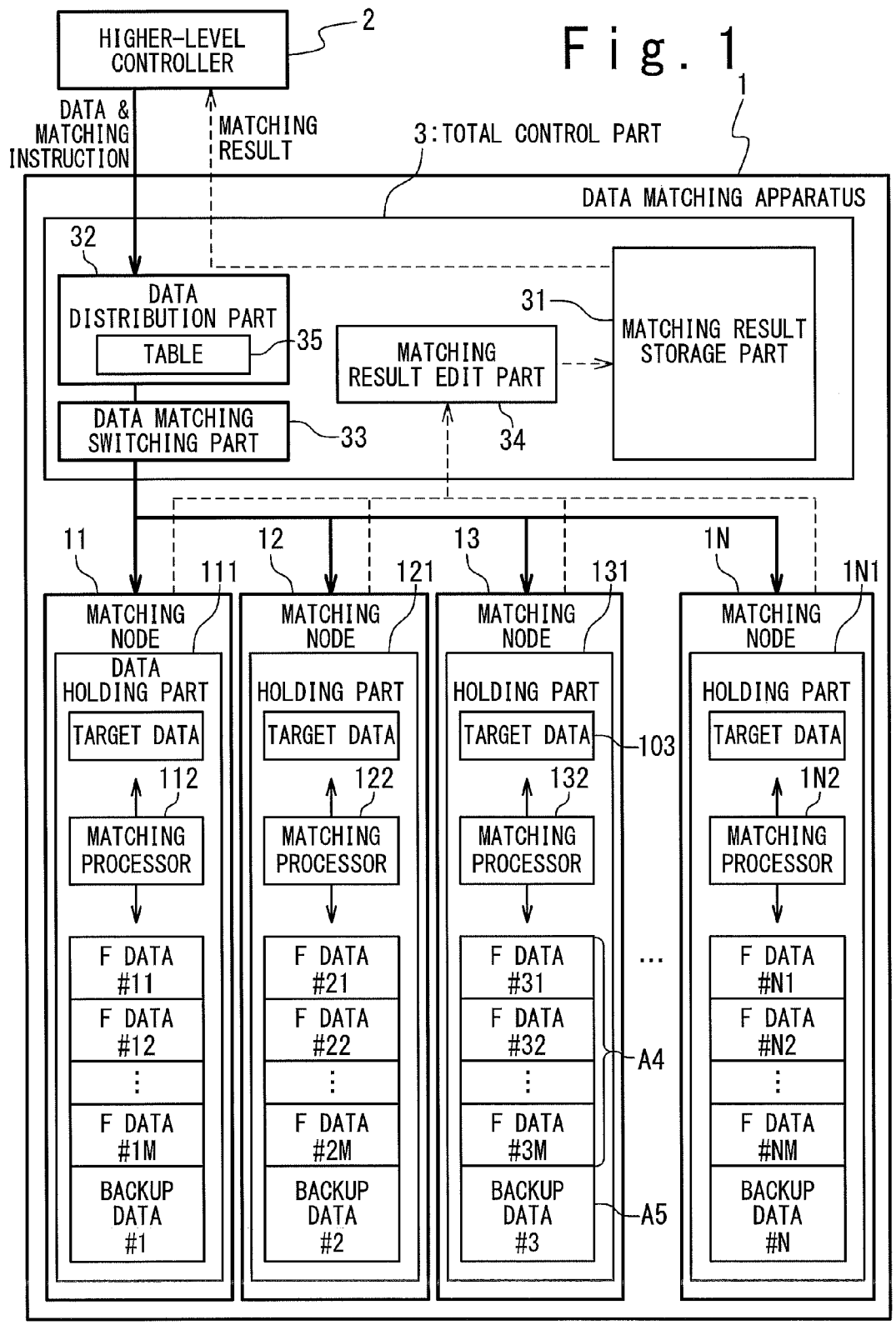
FIG. 1 shows a configuration of a data matching apparatus.

Hereinafter, embodiments of the present invention will be described referring to the accompanying drawings. Referring to FIG. 1, a data matching apparatus 1 is connected to a higher-level controller 2 which transfers a target data and issues a matching instruction. The data matching apparatus 1 includes a plurality of matching nodes 11 to 1N. Each of the matching nodes 11 to 1N includes: target data holding areas 103; data holding parts 111 to 1N1 holding a plurality of pieces of F data (file data) #11 to #NM; and matching processors 112 to 1N2. Each of the matching processors 112 to 1N2 performs, in accordance with the matching instruction from the higher-level controller 2 via a total control part 3, matching of the target data and the F data which are stored in the own matching nodes 11 to 1N. The data holding parts 111 to 1N1 are usually used as areas on which a plurality of programs operate, but when some of the programs are not used, the unused program areas are used as data holding parts.

Each of the data holding parts 111 to 1N1 includes: a target data holding area 103; a normal F data holding area A4; and a backup data holding area A5. The target data holding area 103 stores a target data which is transferred from the higher-level controller 2 and which serves as a subject of matching. The normal F data holding areas A4 hold the F data #11 to #NM as data previously registered and accumulated for matching. The backup data holding area A5 holds backup F data that, in case where a failure occurs in a certain matching node, permits matching to be performed by another matching node for data normally stored in the normal F data holding area A4 of the failure matching node.

The F data and the target data can be composed of personal identification information such as the fingerprint, palm print, iris, face, etc. For example, one piece of F data is information in which a fingerprint and identification information such as the name or a uniquely assigned identifier which specifies the person having the fingerprint.

Each F data has a group attribute. For example, an aggregate of data related to people belonging to a certain group or an aggregate of data related to people sharing a common attribute such as the age group is registered as the F data together with the identification information of this group. That is, the higher-level controller 2 provides the data matching apparatus 1 with an F data group as data of a group including a plurality of pieces of F data related to each person, together with its group attribute. The F data is registered into the matching nodes 11 to 1N in units of groups.

The total control part 3 includes: a matching result storage part 31, a data distribution part 32, a data matching switching part 33, a matching result edit part 34, and a table 35. Each of these parts is a functional block realized by a program stored in a storage device and a CPU of the total control part 3 which reads the program and operates in accordance with the procedure described in the read program.

The data distribution part 32 performs normal F data holding processing and backup processing. In the normal F data holding processing, the data distribution part 32 distributes the F data evenly to the normal F data holding areas A4 of the matching nodes 11 to 1N to hold it therein. More specifically, the data distribution part 32, when the F data group including the plurality of pieces of F data has been inputted, stores this F data group into the normal F data holding area A4 of a j-th matching node 1j (where j is an integer) as a matching node which is included in the plurality of matching nodes 11 to 1N and which has little previously registered normal F data.

In the backup processing, the data distribution part 32 evenly distributes the respective pieces of F data of the matching nodes 11 to 1N to the data holding parts 111 to 1N1 of the matching nodes other than the own matching node 1j to hold them as backup data #1 to #N into the backup data holding areas A5. More specifically, the data distribution part 32 divides the plurality of pieces of F data included in the F data group in the normal F data holding processing for distributing the F data to each of the backup data holding areas A5 of the plurality of the matching nodes other than the j-th matching node 1j. This backup processing is performed in such a manner that used amounts of the backup data holding areas A5 of the plurality of matching nodes 11 to 1N become as even as possible. That is, the plurality of pieces of F data included in the F data group are distributed in turn from the least backup data holding area where a F data being currently stored is least among the plurality of matching nodes 11 to 1N.

The table 35, in the backup processing, stores backup address information indicating where in the backup data holding areas A5 of the plurality of matching nodes 11 to 1N each of the plurality of pieces of F data was stored.

The data matching switching part 33, when a failure has occurred in one of the matching nodes, cuts off this matching node (hereinafter described as a failure node), and continues matching by switching to the backup data distributed to and held in the matching nodes other than the failure node. At each of the matching nodes other than the failure node, with the matching between the normal F data 4 in the own node and the target data, the matching between the backup data 5 in the own node and the target data is also performed. The matching result edit part 34 edits matching results of each of the matching nodes 11 to 1N and stores them into the matching result storage part 31. Hereinafter, more details will be described.

The data matching switching part 33 performs normal matching when no failure occurs in the matching nodes 11 to 1N. Specifically, when a target data has been inputted from the higher-level controller 2, the matching of the target data and the F data stored in each of the normal F data holding areas A4 of the plurality of matching nodes 11 to 1N are performed. When a failure occurs in the j-th matching node 1j of the plurality of matching nodes, the data matching switching part 33 performs backup matching processing by referring to the table 35. Specifically, the data matching switching part 33, referring to the backup address information, performs matching between the target data and the F data stored in each of the backup data holding areas A5 of the plurality of matching nodes 11 to 1N other than the j-th matching node 1j.

Next, referring to FIGS. 1, 2, 3, and 4, operation of the data processing apparatus according to the present embodiment will be described in detail.

(Matching Data Accumulation Processing)

Figure 3:
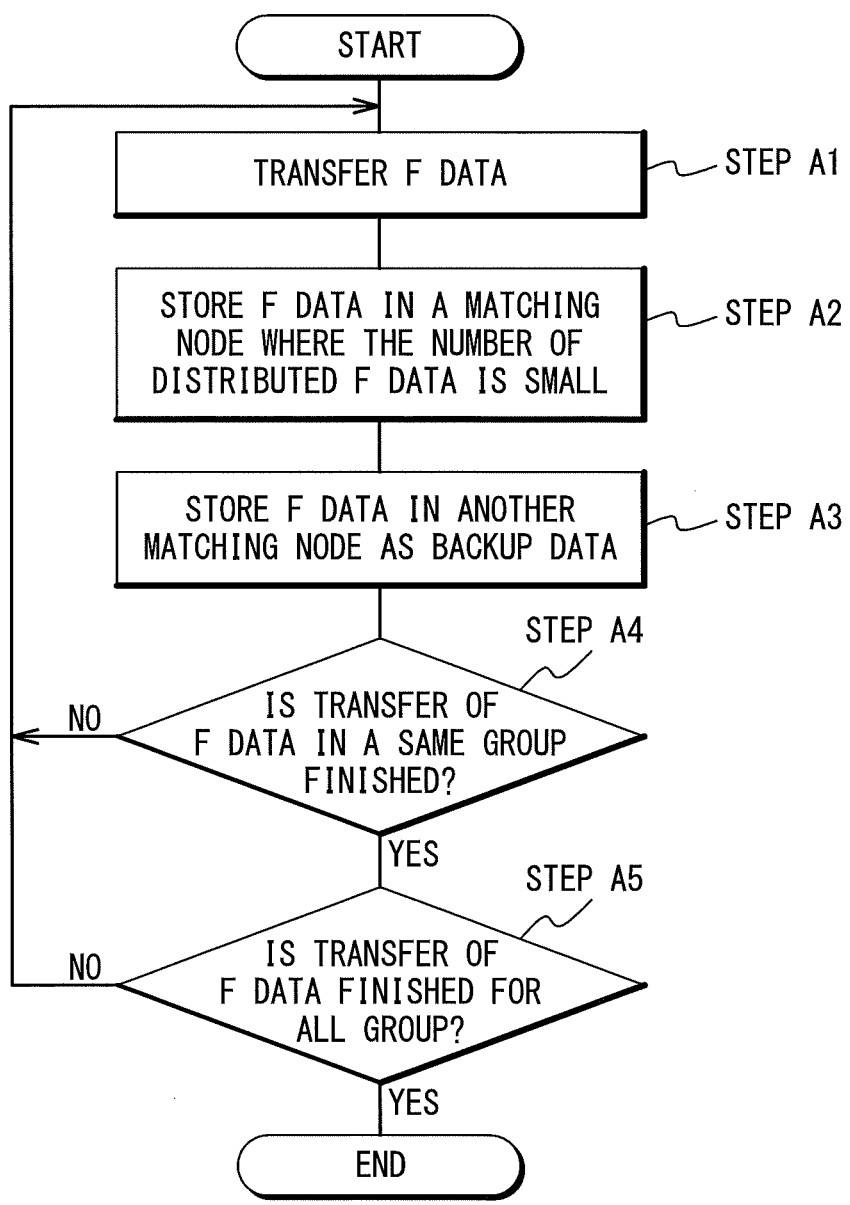
FIG. 3 is a flowchart showing processing of accumulating registration data for matching.

FIG. 3 is a flowchart showing processing of storing F data for matching. When normal F data 4 is transferred from the higher-level controller 2 to the data matching apparatus 1 (step A1), the data distribution part 32 of the total control part 3 performs normal F data distribution processing. This distribution processing is, for each of the groups, performed such that the numbers of F data groups (including the plurality of pieces of F data) stored in the normal F data holding areas A4 of the matching nodes 11 to 1N become as even as possible. That is, the data distribution part 32, comparing the same groups in the matching nodes 11 to 1N, selects the least matching data node 1j where the number of distributed F data group is least. The inputted F data groups are stored into the normal F data holding area A4 of the least matching data node 1j (step A2).

Figure 2:
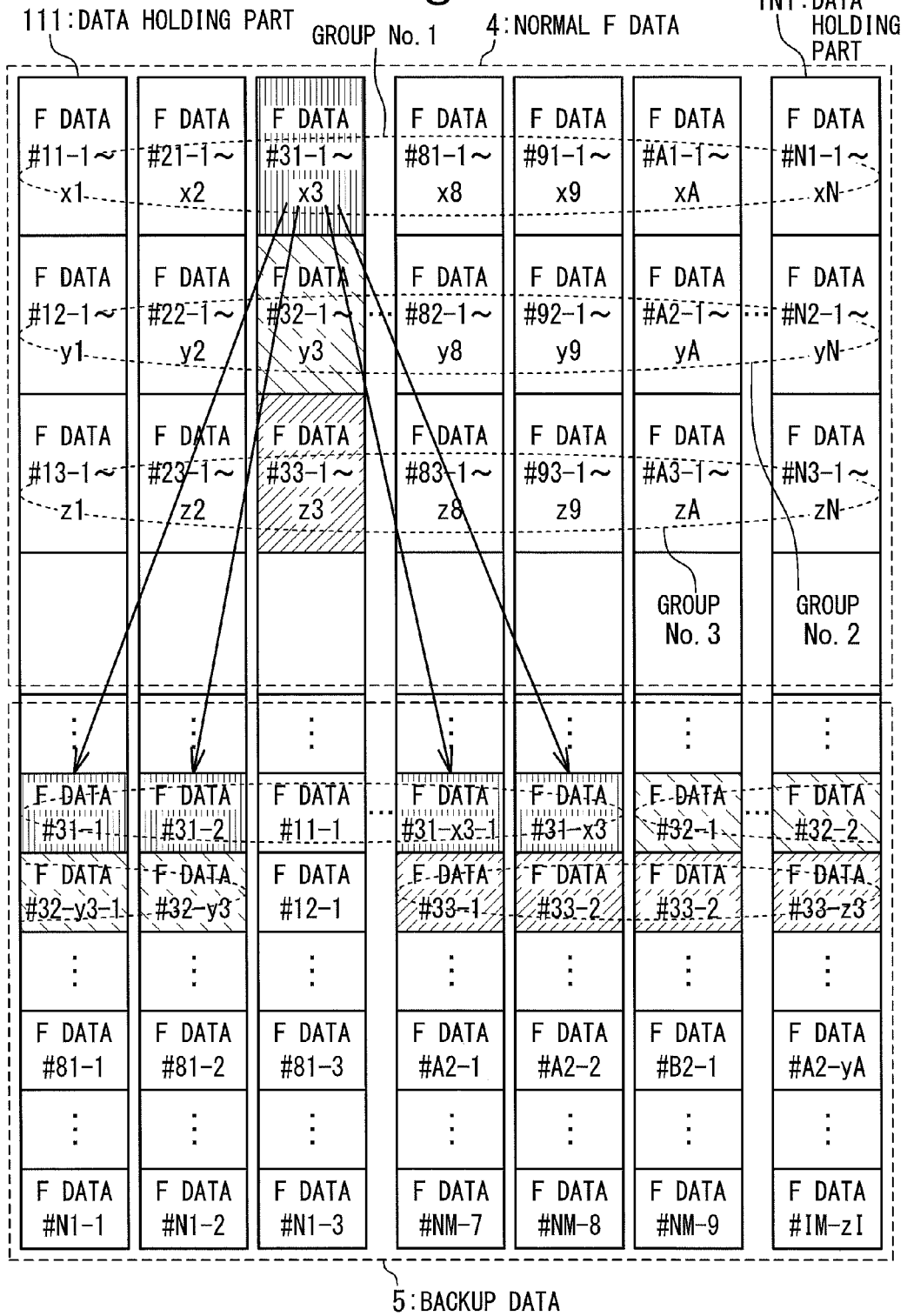
FIG. 2 shows an example of a sequence of data storage.

FIG. 2 shows one example of the normal F data distribution processing. For example, it is assumed that the F data groups including F data having an attribute of a group No. 1 are sequentially provided from the higher-level controller 2 to the data matching apparatus 1. The data distribution part 32 stores them in turn from the least matching data node 1j which is the matching node having a smallest number of F data groups of the group No. 1. Consequently, the data distribution part 32, when the N-number of F data groups have been inputted, evenly distributes them to the normal F data holding areas A4 of the N-number of matching nodes 11 to 1N (F data #11-1-x1 of FIG. 2). Thereafter, in a similar manner, also for the F data groups of the group No. 2 and beyond, the F data groups of the same group are assigned to the matching nodes 11 to 1N as evenly as possible.

The data distribution part 32, when the F data has been inputted from the higher-level controller 2, further performs the backup processing for creating backup data of the inputted F data. The backup processing is performed in such a manner that each F data composing the F data group is distributed to each of the matching nodes 11 to 1N as evenly as possible. More specifically, the data distribution part 32, when the inputted F data group has been stored into the j-th matching node 1j through the normal F data holding processing, stores each F data composing this F data group in turn from the backup data holding area A5 of one of the matching nodes other than the matching node 1j with the least storage amount of F data having the same group attribute as that of the inputted F data (step A3).

FIG. 2 shows one example of a data distribution method in the backup processing. The backup processing in a case where F data groups #31-1 to x3 are stored as the normal F data 4 into the normal F data holding area A4 of the third matching node 13 is explained below. The F data groups #31-1 to x3 are stored as the backup data 5 into the backup data holding areas A5 of the matching nodes other than the matching node 13. Upon this storage, the data distribution part 32 sequentially assigns each F data composing the F data groups #31-1 to x3 to each of the matching nodes as evenly as possible. More specifically, the first F data #31-1 is stored as the backup data 5 of the matching node with a least amount of previously saved F data of the group No. 1. Next, since the F data #31-1 of the group No. 1 has already been stored as the backup data of the first matching node 11, avoiding this, the second F data #31-2 is stored as the backup data 5 of the second matching node 12.

Upon the backup processing, the data distribution part 32 creates the table 35. The table 35 stores: identification information specifying each F data and their groups; and the backup address information indicating the matching nodes and an address of the backup data holding areas A5 storing the F data, which are in association with each other.

Operation of the above steps A1 to A3 are repeated by the number of times corresponding to the number of transferred F data groups (x1 to xN of FIG. 2) (step A4), and further repeated the number of times corresponding to the number of transferred groups (#31 to #33 of FIG. 2) (step A5).

(Matching Processing)

Figure 4:
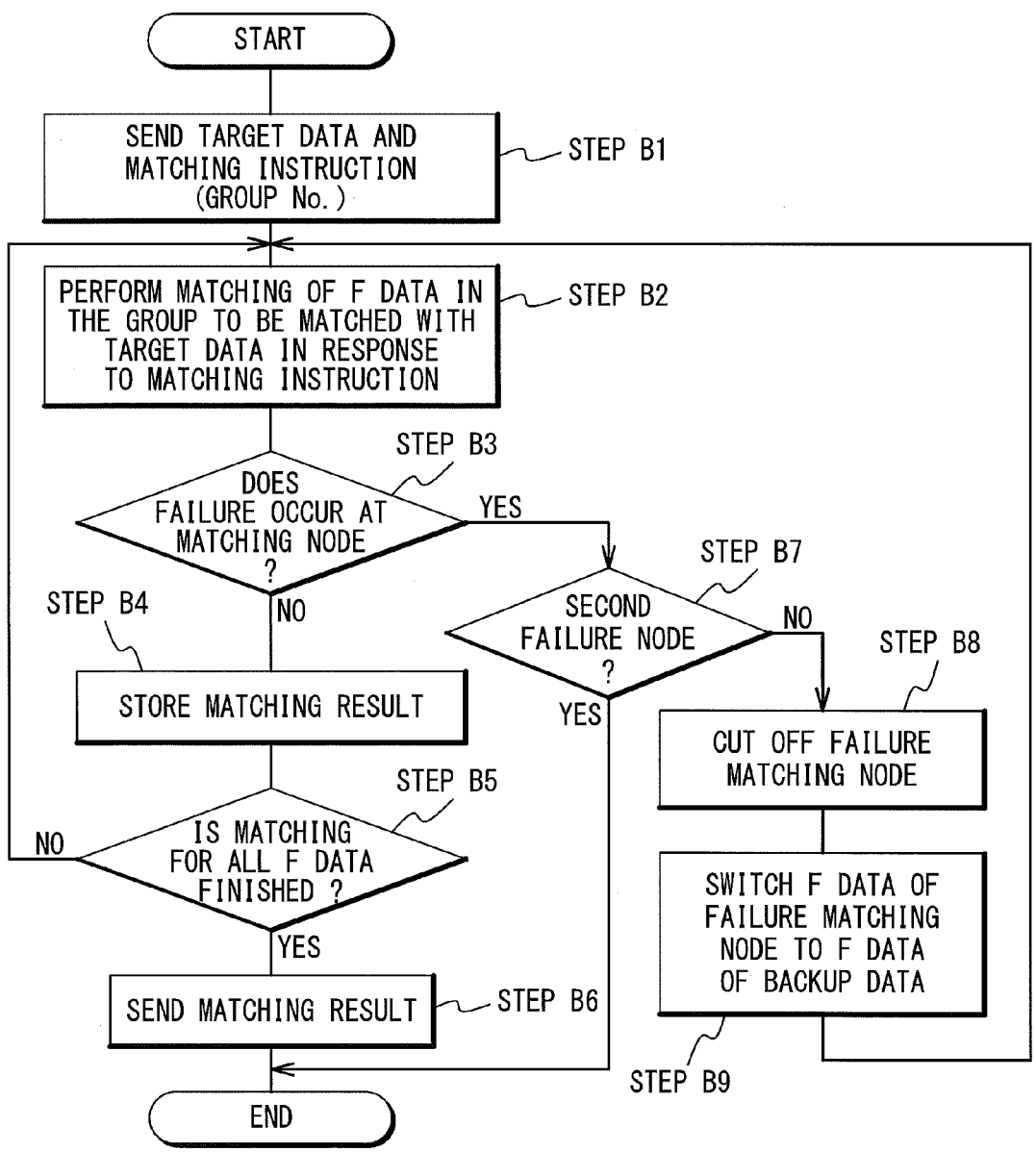
FIG. 4 is a flowchart of matching processing.

FIG. 4 is a flowchart showing matching processing of the F data accumulated in the data matching apparatus 1 and the target data inquired from the higher-level controller 2. The total control part 3 receives a matching instruction (step B1) from the higher-level controller 2. The matching instruction includes: a target data (for example, fingerprint data subject to the request to the data matching apparatus for matching); and a group attribute (for example, the group No. 1) of the registered F data with which the matching of the target data is to be performed. The total control part 3 selects the F data of the group with which the matching of the target data is to be performed, and gives a matching instruction to the matching processor 1j2 of the matching node 1j holding this F data. The data matching switching part 33, when a new matching instruction has been inputted, first performs the normal matching processing. The matching processor 1j2, in response to the matching instruction, performs the matching of the target data with the normal F data 4 belonging to the group stored in the matching node 1j and indicated by the matching instruction (step B2).

The data matching switching part 33 checks whether or not a failure has occurred in each of the matching nodes (step B3). If no failure has occurred, matching results (that is, presence/absence of an F node matched with the target data, and if there is a matched F node, its identification information) are edited by the matching result edit part 34 and stored into the matching result storage part 31 (step B4). The processing of the above steps B2 to B4 is repeated the number of times corresponding to the number of pieces of normal F data included in the group (step B5). When all matching between the target data and the normal F data has been finished, matching results collected by the total control part 3 are sent to the higher-level controller 2 (step B6).

When a failure occurred in any of the matching nodes, the data matching switching part 33 records the identification information of the failure node into a history list of failure nodes. The data matching switching part, when a failure has occurred in any of the matching nodes, referring to the history list of failure nodes, further checks if the node with the new failure is the first failure node in the data matching apparatus 1 (step B7). If the failure node 1j is the first failure node (NO in step B7), this failure node is cut off from the flow of the processing (step B8). Then the normal F data 4 of the failure node 1j is switched to the backup data 5 of the other matching nodes (step B9) and the matching is continuously performed. If the node with the new failure is the second failure node, the matching processing is ended (YES in step B7).

When step B2 is performed after step B9, the data matching switching part 33, referring to the table 35, recognizes the backup address information indicating the address where the backup data 5 with which the matching of the target data in the matching instruction is performed is present, and provides the matching instruction to each of the matching nodes based on this address.

EFFECTS ACHIEVED BY THE PRESENT EMBODIMENT

The first effect of the above-explained embodiment is that, in a data matching apparatus having highly-parallel processors configuration to which a large number of F data for performing matching are previously transferred and held, the cost, power consumption and installation area can be suppressed. A reason for this is as follows. In the present embodiment, the F data groups of a failure node are backed up and multiplexed for every group and every F data on each of the data holding parts of the matching nodes other than the failure node. The backup data is evenly distributed among the matching nodes. When a failure has occurred during matching, the F data group of the failure data is switched to the corresponding backup data, whereby the matching is continued and thus non-stop operation is achieved. Consequently, even when any one of the matching nodes including the matching processor and the data holding part becomes failure, the matching can be continued with the backup data. With such a method, the non-stop operation can be achieved without requiring constructing, as backups, the same number of processors and memories as those of the originally installed processors and memories.

The second effect is that in the data matching apparatus with a highly-parallel processor configuration, when a failure has occurred in a matching node, matching can be continued while cutting off the failure node in a short time. A reason for this is as follows. In the present embodiment, when normal F data is held into a matching node, backup data of the F data is evenly distributed to the backup data holding areas of the matching nodes other than the aforementioned matching node, whereby the F data is multiplexed. Then when a failure has occurred in the matching node, the normal F data is switched to the backup F data stored in the other matching nodes to continue the matching, thereby achieving non-stop operation.

Through such operation, the following advantage can be obtained. In a case of an apparatus where a matching processor is switched to a spare processor when a failure occurs, it is required to transfer the target data and all F data stored in the own memory of the failure processor for redoing the matching again from the beginning. In the present embodiment, such redoing operation is not required, and matching can be continued in short time for coping with the failure.

The third effect is that non-stop operation can be achieved even when any one of the processor, the memory, the memory control part, etc. composing the matching node is failure. A reason for this is as follows. When the matching processor becomes failure, if the memory of the same node becomes failure, the matching cannot be continued in a configuration such that the processor of another node reads data from the memory of the failure node to continue the matching. However, in the present embodiment, even when any one components of a node becomes failure, the failure node is cut off, and the matching is continuously performed with the data provided as the backup in the other matching nodes, thereby permitting the non-stop operation.

What is claimed is:

1. A data processing apparatus comprising:
a plurality of matching nodes, each of the plurality of matching nodes has a normal data holding area and a backup data holding area;
a data distribution part configured to store a file data group, which includes a plurality of file data being registered for matching in advance, in the normal data holding area of a j-th matching node of the plurality of matching nodes when the file data group is inputted, and configured to perform a backup processing by dividing the plurality of file data included in the file data group for distributing the plurality of file data to the backup data holding area of each of the plurality of matching nodes other than the j-th matching node as backup data;
a data matching switching part configured to perform matching of the file data group stored in the normal data holding area of each of the plurality of matching data and target data being a target of matching when the target data is inputted, and configured to switch into backup matching processing by which matching of the plurality of file data stored in the backup data holding area of each of the plurality of matching nodes other than the j-th matching node and the target data is performed when a failure occurs at the j-th matching node; and
a table in which a place where each of the plurality of file data is stored among the plurality of matching nodes by the backup processing is indicated,
wherein j is an integer,
wherein the backup matching processing is performed by searching the backup data holding area where the backup data of the j-th matching node is stored among the plurality of matching nodes by referring to the table,
wherein the backup processing is performed by distributing each of the plurality of file data included in the file data group to the backup data holding area in turn from a least backup data holding area where a file data being currently stored is least among the plurality of matching nodes,
wherein the backup processing is performed at a stage of storing the file data group in the plurality of matching nodes and the backup matching processing is performed after the backup processing is performed.

2. The data processing apparatus according to claim 1, wherein the file data group belongs to any of a plurality of groups, and
the data distribution part is configured to store an input file data group in a least matching data node where the file data group belonging to a same group as the input file data group is least among the plurality of matching nodes when the input file data group is inputted.

3. A data processing method comprising:
providing a plurality of matching nodes, each of the plurality of matching nodes has a normal data holding area and a backup data holding area;
storing a file data group, which includes a plurality of file data being registered for matching in advance, in the normal data holding area of a j-th matching node of the plurality of matching nodes when the file data group is inputted;
performing a backup processing by dividing the plurality of file data included in the file data group for distributing the plurality of file data to the backup data holding area of each of the plurality of matching nodes other than the j-th matching node as backup data;
performing matching of the file data group stored in the normal data holding area of each of the plurality of matching data and target data being a target of matching when the target data is inputted;
switching into a backup matching processing by which matching of the plurality of file data stored in the backup data holding area of each of the plurality of matching nodes other than the j-th matching node and the target data is performed when a failure occurs at the j-th matching node; and
preparing a table in which a place where each of the plurality of file data is stored among the plurality of matching nodes by the backup processing is indicated,
wherein j is an integer,
wherein the backup matching processing is performed by searching the backup data holding area where the backup data of the j-th matching node is stored among the plurality of matching nodes by referring the table,
wherein the backup processing is performed by distributing each of the plurality of file data included in the file data group to the backup data holding area in turn from a least backup data holding area where a file data being currently stored is least among the plurality of matching nodes, and
wherein the backup processing is performed at a stage of the storing the file data group in the plurality of matching nodes and the backup matching processing is performed after the backup processing is performed.

4. The data processing method according to claim 3, wherein the file data group belongs to any of a plurality of groups, and
at the backup processing, an input file data group is stored in a least matching data node where the file data group belonging to a same group as the input file data group is least among the plurality of matching nodes when the input file data group is inputted.

* * * * *